UNITED STATES PATENT OFFICE.

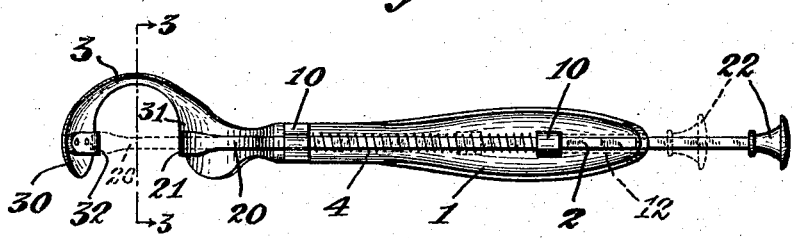
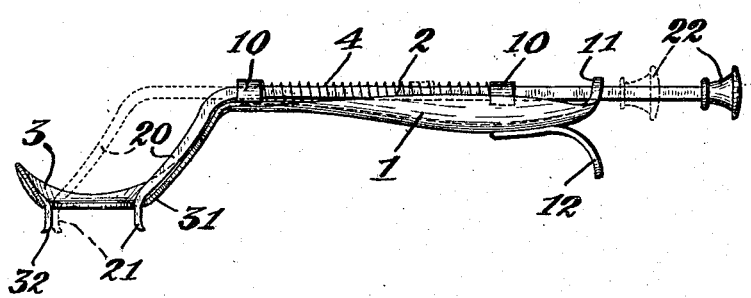
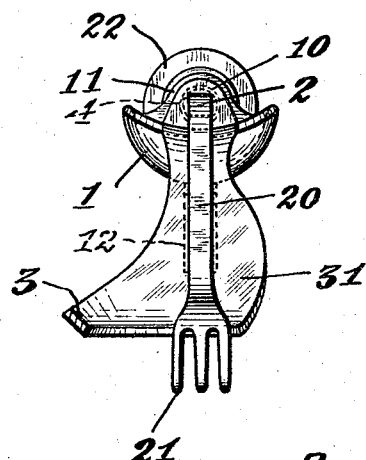

OSCAR T. DEAN, OF SEATTLE, WASHINGTON.

RETRACTOR FOR DENTAL SURGERY.

1,185,292.  Specification of Letters Patent.  Patented May 30, 1916.

Application filed December 27, 1915. Serial No. 68,930.

*To all whom it may concern:*

Be it known that I, OSCAR T. DEAN, a citizen of the United States, and a resident of Seattle, King county, Washington, have invented certain new and useful Improvements in Retractors for Dental Surgery, of which the following is a specification.

My invention relates to surgical instruments and consists of a retractor designed for use in dental surgery.

The object of my invention is to provide a more convenient and efficient tool for use in performing certain special operations in dental surgery. The operation for which it is more particularly intended is that of the removal of embedded molars, although it will be evident that it may be used to advantage in other operations where somewhat similar conditions are found.

The novel features of my invention consist of certain parts and combinations of parts which will be hereinafter described and then particularly pointed out in the claims.

In the accompanying drawings I have shown my invention in the form of construction which is now most preferred by me.

Figure 1 is a top view of the device, Fig. 2 a side view and Fig. 3 an end view.

The device has a handle member 1 which, at one end, has an arm 3 which curves in approximately a U-shape when viewed from above, or as seen in Fig. 1. The outer end 30 of this arm is in substantial alinement with the axis of the handle, as viewed from above. As seen from the side, as in Fig. 2, it is downwardly offset. Mounted upon the handle to reciprocate longitudinally thereof, is a rod 2. This is shown as guided in ears 10, 10. This rod is prevented from turning, as by making it of square cross section in its bearings. At one end it is offset to bring its tip down against the outer edge of the inner arm 31 of the U-shaped part 3 of the handle member. This offset arm 20 terminates in fingers or teeth 21 which are opposed to like teeth 32 carried by the end 30. The direction of reciprocation of bar 2 is such that it will bring the two sets of teeth 21 and 32 together when the bar is pushed outward. The bar 2 is acted upon by a spring 4 to normally maintain it in retracted position, or that shown in full lines. The opposite end of bar 2 is preferably shaped to be comfortably engaged by the hand to reciprocate it against the pressure of the spring. I have shown it as having a knob 22. The bar passes through a hole in the upturned end of the handle at 11, thus providing another guide. This end of the handle is also provided with a stop 12, whereby its movement lengthwise within the hand is prevented. The handle is shaped to fit nicely within the hand and also to obtain stiffness with light weight. To this end it is made of thin section and rounded.

The purpose of this device is to act as a retractor for the lips of incisions made for surgical purposes, whereby these lips will be held apart to permit free work on portions between them and below the surface. As a particular instance of the use of this device may be mentioned the removal of embedded molars. These are molars which lie more or less in horizontal position pressing endwise against other teeth and not appearing at the surface. To remove them the gums above them are cut so that the flaps formed may be turned back to give access to the tooth. This is then cut and removed in parts and the edges of the slits in the gum sewed together. After making the slits in the gum, the retractor is placed to engage the opposite edges by the teeth 21 and 32 and the spring allowed to separate the sides and hold them apart while the other work progresses. The U-shape of the arm 3 provides an open space in which to work. The offsetting by the angle arm 20 also permits access when otherwise the edges of the mouth might interfere. The particular use above referred to is given only in illustration of its manner of use and not as limiting the device to this particular use.

In practice these instruments will be made right and left handed. I have shown only one, as the change required to make the other is obvious.

What I claim as my invention is:

1. A retractor for dental surgery comprising a handle having a U-shaped end with its outer arm provided with engaging points, a bar mounted to reciprocate lengthwise upon the handle and having complemental engaging points, and a spring acting to normally separate said sets of points.

2. A retractor for dental surgery comprising a handle having an end laterally offset and terminating in a U-shape, the outer arm of said end being provided with engaging points, a bar mounted to reciprocate lengthwise said handle and having its end provided with complementary engaging points coöperating with those carried by the said outer arm.

3. A retractor for dental surgery comprising a handle having a laterally extending arm at one end provided with engaging points, a member movable upon said arm and having complemental engaging points adapted to be moved toward and from the first set, a spring for separating said sets of points, and means for bringing said points toward each other by the hand holding the device.

4. A retractor for dental surgery comprising a handle having at one end a laterally extending arm terminating in engaging points, a rod mounted to reciprocate lengthwise the handle and held against turning, one end of said arm having engaging points complementary to the first set, and a spring acting to normally separate said sets of points.

Signed at Seattle, Washington, this 2nd day of December, 1915.

OSCAR T. DEAN.

Copies of this patent may be obtained for five cents each, by addressing the "Commissioner of Patents, Washington, D. C."